United States Patent
Umeda

(10) Patent No.: US 7,343,776 B2
(45) Date of Patent: Mar. 18, 2008

(54) METHOD AND DEVICE FOR MEASURING DYNAMIC LINEARITY OF ACCELERATION SENSOR

(75) Inventor: Akira Umeda, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 253 days.

(21) Appl. No.: 10/509,628

(22) PCT Filed: Mar. 31, 2003

(86) PCT No.: PCT/JP03/04131

§ 371 (c)(1), (2), (4) Date: Apr. 6, 2005

(87) PCT Pub. No.: WO03/087849

PCT Pub. Date: Oct. 23, 2003

(65) Prior Publication Data

US 2005/0160785 A1    Jul. 28, 2005

(30) Foreign Application Priority Data

Mar. 29, 2002    (JP)    ............................. 2002-097190

(51) Int. Cl.
  *G01P 21/00*    (2006.01)
(52) U.S. Cl. ...................................................... 73/1.37
(58) Field of Classification Search ......... 73/1.37–1.41
  See application file for complete search history.

(56) References Cited

U.S. PATENT DOCUMENTS 3,830,091 A * 8/1974 Sinsky ....................... 73/1.38
5,000,030 A    3/1991 Umeda et al.
5,042,302 A * 8/1991 Soelkner ....................... 73/597
5,952,554 A    9/1999 Umeda
6,286,359 B1   9/2001 Umeda
7,076,991 B2 * 7/2006 Umeda ....................... 73/1.39
7,165,440 B2 * 1/2007 Umeda ....................... 73/1.39

FOREIGN PATENT DOCUMENTS

JP    3-109165    11/1991
JP    5-273232    10/1993

* cited by examiner

*Primary Examiner*—Hezron Williams
*Assistant Examiner*—Nashmiya Fayyaz
(74) *Attorney, Agent, or Firm*—Oblon, Spivak, McClelland, Maier & Neustadt, P.C.

(57) ABSTRACT

An elastic wave pulse is generated in a metal rod (1) by impacting an end surface (2) of the metal rod with each of two round, concentric projectiles (8, 10) from a double launch tube (4, 5) independently, and by impacting both projectiles simultaneously or at a prescribed time interval. An acceleration sensor (23) is provided on another end surface (22) of the metal rod to measure an acceleration of the other end surface arising when the elastic wave pulse generated by the impact of the projectiles reflects at the other end surface. The motion of the end surface is measured by a laser interferometer (24) or by a strain gauge (25) provided on a side surface of the metal rod, and the measured signals are calculated and corrected as appropriate. The dynamic linearity of the acceleration sensor is obtained by comparing in time domain and frequency domain the calculated results with the measured values of the acceleration sensor.

33 Claims, 1 Drawing Sheet

METHOD AND DEVICE FOR MEASURING DYNAMIC LINEARITY OF ACCELERATION SENSOR

TECHNICAL FIELD

The present invention relates to a method and apparatus for measuring the dynamic linearity of an acceleration sensor used in fields in which it is essential to measure motion, such as of car crash safety testing, robots, transportation equipment, equipment relating to nuclear power generation, ships, space and aeronautical equipment and micromotion devices and the like.

BACKGROUND ART

Acceleration sensors are used in fields in which it is essential to measure motion, such as, for example, of car crash safety testing, robots, transportation equipment, equipment relating to nuclear power generation, ships, space and aeronautical equipment, micro-motion devices and the like. In order to maintain the accurate measurement by such acceleration sensors, it is necessary to periodically calibrate the acceleration sensors. Conventionally the most reliable method for this calibration has been to affix the acceleration sensor to a mounting table, use a laser interferometer to measure the motion of the mounting table, and compare the measured value with the output value of the acceleration sensor affixed to the mounting table.

However, in the above conventional acceleration calibration technology, no technology has yet been established concerning the measurement of dynamic linearity at an acceleration level and within a frequency range required by industry, so the situation is that there is as yet no international standard provided for the technology.

There exists a piezoelectric acceleration sensor used as a conventional acceleration sensor. A feature of the piezoelectric acceleration sensor is that it can measure up to very high shock acceleration; this product is on the market and is extensively used. However, with respect also to this piezoelectric acceleration sensor, no technique has been proposed for measuring dynamic linearity, which is a very important aspect of dynamic measurement. Consequently, it is not at all known if dynamic linearity has actually been established up to a high acceleration level in the order of $10^6$ m/s$^2$, so on this point, reliability of the sensor is inadequate.

In the field of acceleration detection, there are seismographs. In the measuring of acceleration at low frequencies, such as in earthquake measurement, although it is necessary to evaluate the effect of parasitic rolling vibration of the mounting table, such evaluation is difficult, and since at the same time it is also difficult to realize low frequency vibration with high linearity, acceleration sensors able to measure acceleration from a direct current component are still only calibrated statically.

Therefore, with respect to acceleration sensors utilized in important fields of industry, an object of the present invention is to provide a method and apparatus for accurately and easily measuring the dynamic linearity of this acceleration sensor over a wide range, from acceleration values generally utilized in such fields up to acceleration in the order of $10^6$ m/s$^2$, and as a result, making it possible to accurately and easily calibrate the acceleration sensor.

The present invention resolved the above problems in accordance with the basic concept described below. That is, in the general field of measurement technology, accurate measurement cannot be achieved unless linearity is established. Linearity is also important in dynamic measurement, but with respect to gain and phase, generally it is not easy to verify dynamic linearity. However, as a general definition, when there is an output signal X(t) for an input signal x(t) and an output signal Y(t) for an input signal y(t), using arbitrary constants a and b, dynamic linearity is established if the output signal for an input signal a·x(t)+b·y(t) becomes a·X(t)+b·Y(t).

The acceleration sensor that is the measurement object is attached to the end surface of the metal rod. Acceleration of the end surface produced when an elastic wave pulse generated by an inner projectile launched from the inner launch tube to impact the rod end surface reflects at the other end surface, that is, input acceleration signal $a_{in,1}(t)$ to the acceleration sensor and acceleration sensor output $a_{out,1}(t)$ are obtained. Next, acceleration of the end surface produced when an elastic wave pulse generated by an outer projectile launched from the outer launch tube to impact the rod end surface reflects at the other end surface, that is, input acceleration signal $a_{in,2}(t)$ to the acceleration sensor and acceleration sensor output $a_{out,2}(t)$ are obtained. Instead, an outer projectile may be launched from an outer launch tube first, and then an inner projectile from an inner launch tube.

Finally, when an inner projectile and an outer projectile are made to simultaneously impact the metal rod, from the linearity of the elastic wave, the acceleration signal acting as an input signal to the acceleration sensor will be $a_{in,1}(t)+a_{in,2}(t)$. The acceleration sensor output signal at this time is taken to be $a_{out}(t)$. If linearity is established, since the output signal will be $a_{out,1}(t)+a_{out,2}(t)$, by comparing this signal with $a_{out}(t)$ in frequency domain or time domain, a method of measuring the dynamic linearity of the acceleration sensor with respect to gain and phase is attained, and an apparatus implementing the method. The projectile from the inner launch tube and the projectile from the outer launch tube when the above projectiles are launched simultaneously have the same shape as in the case where each is launched on its own, and conditions, such as launch pressure, initial position inside the launch tube and so forth, have to be the same.

DISCLOSURE OF THE INVENTION

The present invention provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, and using an optical measuring instrument to measure and calculate the acceleration of the other end surface, in which the dynamic linearity of the acceleration sensor is obtained by comparing in time domain and frequency domain an acceleration output signal of the acceleration sensor when two projectiles are impacted simultaneously or at a prescribed time interval with a sum of acceleration signals obtained when two projectiles are launched separately, measured and calculated by the optical measuring instrument.

The present invention also provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, and using a strain gauge provided on a side surface of the metal rod to measure strain in the elastic wave pulse produced by the projectile impact, in which the dynamic linearity of the acceleration sensor is obtained by comparing in time domain and frequency domain an output signal of the acceleration sensor when two projectiles are impacted simultaneously or at a prescribed time interval with a sum of acceleration signals obtained from strain gauge measurement signals obtained when two projectiles are launched separately.

The present invention also provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, and measuring strain in the elastic wave pulse produced by the projectile impact at a representative strain gauge location of a plurality of strain gauges affixed axially along a side surface of the metal rod, in which the dynamic linearity of the acceleration sensor is obtained by comparing in time domain and frequency domain an output signal of the acceleration sensor when two projectiles are impacted simultaneously or at a prescribed time interval with a sum of acceleration signals obtained from strain gauge measurement signals obtained when two projectiles are launched separately.

The present invention also provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, using a strain gauge provided on a side surface of the metal rod to measure strain in the elastic wave pulse produced by the projectile impact, and calculating a correction to a strain gauge measurement signal corresponding to wave dispersion and attenuation according to elastic wave pulse propagation theory, in which the dynamic linearity of the acceleration sensor is obtained by comparing in time domain and frequency domain an output signal of the acceleration sensor when two projectiles are impacted simultaneously or at a prescribed time interval with a sum of acceleration signals obtained from correction calculated signals obtained from the strain gauge when two projectiles are launched separately.

The present invention also provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, measuring strain in the elastic wave pulse produced by the projectile impact at a representative strain gauge location of a plurality of strain gauges affixed axially along a side surface of the metal rod, and calculating a correction to a strain gauge measurement signal corresponding to wave dispersion and attenuation according to elastic wave pulse propagation theory, in which the dynamic linearity of the acceleration sensor is obtained by comparing in time domain and frequency domain an output signal of the acceleration sensor when two projectiles are impacted simultaneously or at a prescribed time interval with a sum of acceleration signals obtained from correction calculated signals obtained from the strain gauge when two projectiles are launched separately.

The present invention also provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, using an optical measuring instrument to measure the acceleration of the other end surface, using a strain gauge provided on a side surface of the metal rod to measure strain in the elastic wave pulse produced by the projectile impact, and calculating a correction to a strain gauge measurement signal corresponding to wave dispersion and attenuation according to elastic wave pulse propagation theory, using an output signal of the optical measuring instrument that measured the acceleration of the other end surface, in which the dynamic linearity of the acceleration sensor is obtained by comparing in time domain and frequency domain an output signal of the acceleration sensor when two projectiles are impacted simultaneously or at a prescribed time interval with a sum of acceleration signals obtained from correction calculated signals obtained from the strain gauge when two projectiles are launched separately.

The present invention also provides a method for measuring dynamic linearity of an acceleration sensor, comprising generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface, using an optical measuring instrument to measure the acceleration of the other end surface, measuring strain in the elastic wave pulse produced by the projectile impact at a representative strain gauge location of a plurality of strain gauges affixed axially along a side surface of the metal rod, and calculating a correction to a strain gauge measurement signal corresponding to wave dispersion and attenuation according to elastic wave pulse propagation theory, using an output signal of the optical measuring instrument that measured the acceleration of the other end surface, in which the dynamic linearity of the acceleration sensor is obtained by comparing in time domain and frequency domain an output signal of the acceleration sensor when two projectiles are impacted simultaneously or at a prescribed time interval with a sum of acceleration signals obtained from correction calculated signals obtained from the strain gauge when two projectiles are launched separately.

In any one of the second to seventh mentioned methods that are for measuring dynamic linearity of an acceleration sensor, the strain gauge is composed of a plurality of strain gauges provided on a circumference at a same distance from the one end surface of the metal rod to use output signals from the plurality of strain gauges.

In any one of the third and seventh mentioned methods that are for measuring dynamic linearity of an acceleration sensor, the plurality of strain gauges are provided at a plurality of locations in an axial direction that are provided in a plurality on a circumference at each location at a same distance from the one end surface of the metal rod to use output signals from the plurality of strain gauges.

In any one of the first, sixth and seventh mentioned methods that are for measuring dynamic linearity of an acceleration sensor, the optical measuring instrument comprises a laser interferometer.

The present invention further provides an apparatus for measuring dynamic linearity of an acceleration sensor, comprising a launch apparatus that impacts one of end surfaces of a metal rod with each of two round, concentrically located projectiles from a double launch tube independently and impacts both projectiles simultaneously or at a prescribed time interval to generate an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, an optical measuring instrument that measures a velocity of motion of the other end surface and calculates it as acceleration, and comparison means that compares in time domain and frequency domain an output signal of the acceleration sensor when the two projectiles are impacted simultaneously or at a prescribed time interval with the acceleration obtained when the two projectiles are launched separately, measured and calculated by the optical measuring instrument.

The present invention also provides an apparatus for measuring dynamic linearity of an acceleration sensor, comprising a launch apparatus that impacts one of end surfaces of a metal rod with each of two round, concentrically located projectiles from a double launch tube independently, and by impacts both projectiles simultaneously or at a prescribed time interval to generate an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, a strain gauge provided on a side surface of the metal rod to measure strain in the elastic wave pulse, and comparison means that compares in time domain and frequency domain an output signal of the acceleration sensor when the two projectiles are impacted simultaneously or at a prescribed time interval with a sum of acceleration signals obtained from strain gauge measurement signals obtained when the two projectiles are launched separately.

The present invention also provides an apparatus for measuring dynamic linearity of an acceleration sensor, comprising a launch apparatus that impacts one of end surfaces of a metal rod with each of two round, concentrically located projectiles from a double launch tube independently and impacts both projectiles simultaneously or at a prescribed time interval to generate an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, a strain gauge provided at a plurality of locations axially along a side surface of the metal rod that measures strain in the elastic wave pulse, and comparison means that compares in time domain and frequency domain an output signal of the acceleration sensor when the two projectiles are impacted simultaneously or at a prescribed time interval with a sum of acceleration signals obtained from strain measurement signals produced by the acceleration at a representative strain gauge location.

The present invention also provides an apparatus for measuring dynamic linearity of an acceleration sensor, comprising a launch apparatus that impacts one of end surfaces of a metal rod with each of two round, concentrically located projectiles from a double launch tube independently and impacts both projectiles simultaneously or at a prescribed time interval to generates an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, a strain gauge provided on a side surface of the metal rod to measure strain in the elastic wave pulse, calculation means that calculates a correction to a strain gauge measurement signal corresponding to wave dispersion and attenuation according to elastic wave pulse propagation theory, and comparison means that compares in time domain and frequency domain an output signal of the acceleration sensor when the two projectiles are impacted simultaneously or at a prescribed time interval with a sum of acceleration signals obtained from correction calculated signals obtained from the strain gauge when the two projectiles are launched separately.

The present invention also provides an apparatus for measuring dynamic linearity of an acceleration sensor, comprising a launch apparatus that impacts one of end surfaces of a metal rod with each of two round, concentrically located projectiles from a double launch tube independently and impacts both projectiles simultaneously or at a prescribed time interval to generates an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, a strain gauge provided at a plurality of locations axially along a side surface of the metal rod that measures strain in the elastic wave pulse, calculation means that obtains a representative location measurement signal from a strain gauge measurement signal and calculates a correction to the representative location measurement signal corresponding to wave dispersion and attenuation according to elastic wave pulse propagation theory, and comparison means that compares in time domain and frequency domain an output signal of the acceleration sensor when the two projectiles are impacted simultaneously or at a prescribed time interval with a sum of acceleration signals obtained from correction calculated signals based on strain gauge measurement signals obtained when the two projectiles are launched separately.

The present invention also provides an apparatus for measuring dynamic linearity of an acceleration sensor, comprising a launch apparatus that impacts one of end surfaces of a metal rod with each of two round, concentrically located projectiles from a double launch tube independently and impacts both projectiles simultaneously or at a prescribed time interval to generate an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, a strain gauge provided at a plurality of locations axially along a side surface of the metal rod for measuring strain in the elastic wave pulse, an optical measuring instrument that measures a velocity of motion of the other end surface, calculation means that calculates a correction to a strain gauge measurement signal corresponding to wave dispersion and attenuation according to elastic wave pulse propagation theory, based on an output signal of the optical measuring instrument, and comparison means that compares in time domain and frequency domain an output signal of the acceleration sensor when the two projectiles are impacted simultaneously or at a prescribed time interval with a sum of acceleration signals obtained from correction calculated signals obtained from the strain gauge when the two projectiles are launched separately.

In any one of the second to sixth mentioned apparatus for measuring dynamic linearity of an acceleration sensor, the strain gauge comprises a plurality of strain gauges provided on a circumference at a same distance from the one end surface of the metal rod to use output signals from the plurality of strain gauges.

In the sixth or seventh mentioned apparatus for measuring dynamic linearity of an acceleration sensor, the calculation means calculates the correction to the strain gauge measurement signal corresponding to wave dispersion and attenuation according to elastic wave pulse propagation theory, based on an output signal of the optical measuring instrument, with the acceleration sensor not attached to the metal rod.

The present invention also provides an apparatus for measuring dynamic linearity of an acceleration sensor, comprising a launch apparatus that impacts one of end surfaces of a metal rod with each of two round, concentrically located projectiles from a double launch tube independently and impacts both projectiles simultaneously or at a prescribed time interval to generates an elastic wave pulse in the metal rod, an acceleration sensor affixed to the other of the end surfaces of the metal rod to measure an acceleration of the other end surface arising when the elastic wave pulse generated by the impact of the projectiles reflects at the other end surface, a strain gauge provided at a plurality of locations axially along a side surface of the metal rod that measures strain in an elastic wave pulse, an optical measuring instrument for measuring a velocity of motion of the other end surface, calculation means that calculates a correction to a strain measurement signal produced by the acceleration at a representative strain gauge location corresponding to wave dispersion and attenuation according to elastic wave pulse propagation theory, based on an output signal of the optical measuring instrument, and comparison means that compares in time domain and frequency domain an output signal of the acceleration sensor with a correction calculated signal obtained from the strain gauge.

In any one of the second to ninth mentioned apparatus for measuring dynamic linearity of an acceleration sensor, the strain gauge comprises strain gauges provided at a plurality of locations in an axial direction that are provided in a plurality on a circumference at each location at a same distance from the one end surface of the metal rod.

In any one of the first, sixth and ninth mentioned apparatus for measuring dynamic linearity of an acceleration sensor, the optical measuring instrument comprises a laser interferometer, and in any one of the ninth to eleventh mentioned apparatus the calculation means calculates a correction to an elastic wave pulse strain signal produced at a representative strain gauge location by the projectile impact corresponding to wave dispersion and attenuation according to elastic wave pulse propagation theory, based on a signal of the optical measuring instrument, with the acceleration sensor attached to the metal rod.

In any one of the first to eleventh mentioned apparatus for measuring dynamic linearity of an acceleration sensor, the projectile has a laminated structure of different materials, and the launch apparatus is a multiple launch tube having inner and outer launch tubes in which a frequency band of the elastic wave generated in the metal rod can be narrowed by launching multiple projectiles from the inner launch tube and controlling a phase of each projectile launch.

In any one of the first to eleventh mentioned apparatus for measuring dynamic linearity of an acceleration sensor, in accordance with a theoretical propagation of the elastic wave in the metal rod, when obtaining transient signal distortion of the elastic wave pulse incident on the other end surface from a strain gauge output signal, at least a primary term or up to a high-order term of a series-expanded Skalak's solution is used.

In any one of the first to eleventh mentioned apparatus for measuring dynamic linearity of an acceleration sensor, the dynamic linearity of the acceleration sensor is measured by measuring the acceleration of the metal rod end surface and comparing in frequency domain an acceleration sensor input acceleration signal with an acceleration sensor output signal derived from acceleration measurement results, strain gauge measurements or wave propagation theory.

Any one of the first to twelfth mentioned apparatus for measuring dynamic linearity of an acceleration sensor further comprises a dynamic linearity calculation means that obtains a difference in timing at which the two projectiles impact the metal rod as a parameter in which a transient acceleration signal input to the acceleration sensor generated when a first projectile impacts the metal rod, and a transient acceleration signal input to the acceleration sensor generated when a second projectile impacts the metal rod, best match a transient acceleration signal input to the acceleration sensor generated when both projectiles are launched simultaneously, and measures the dynamic linearity of the acceleration sensor from an acceleration sensor output signal obtained when each projectile is launched independently and an acceleration sensor output signal obtained when both projectiles are launched at a prescribed time differential.

Any one of the first to eleventh mentioned apparatus for measuring dynamic linearity of an acceleration sensor further comprises a support means that uses point contact that does not hinder rigid motion in an axial direction for supporting the metal rod horizontally.

Any one of the first to eleventh mentioned apparatus for measuring dynamic linearity of an acceleration sensor further comprises a metal ball contacted to the metal rod end surface and the projectile launch apparatus launches a plurality of projectiles disposed in a concentric circle from the multiple launch tube and precisely controls the launch timing with respect to the metal ball, to generate an elastic wave pulse in the metal rod.

In any one of the above apparatus for measuring the dynamic linearity of an acceleration sensor, a correction function correcting wave dispersion, wave attenuation, uncertainty of sound velocity value, acceleration sensor mass, gauge frequency response and the like, and the metal rod to which a gauge is affixed, are constituted as a set of essential replacement parts required to match individual acceleration sensors.

In any one of the first to seventh mentioned methods for measuring dynamic linearity of an acceleration sensor, an inner projectile or outer projectile, or an inner group of projectiles launched from a multiple inner launch tube, or an outer group of projectiles launched from a multiple outer launch tube does not depend on a launch sequence.

In any one of the first, sixth and ninth mentioned apparatus for measuring dynamic linearity of an acceleration sensor, an inner projectile or outer projectile, or an inner group of projectiles launched from a multiple inner launch tube, or an outer group of projectiles launched from a multiple outer launch tube does not depend on a launch sequence.

As described in the above, a projectile is impacted against a metal rod, generating an elastic wave pulse in the metal rod; the velocity of the motion at the end surface is measured using an acceleration sensor, motion of the end surface is measured using a laser interferometer or a strain gauge, and the measured signals are calculated and corrected, and the calculation results and the measured values of the acceleration sensor are compared in time domain and frequency domain, thereby making it possible to accurately and easily measure dynamic linearity in a wide range of acceleration in the order of $10^6$ m/S$^2$, enabling accurate calibration of the acceleration sensor.

BEST MODE FOR CARRYING OUT THE INVENTION

Figures 1, 2:
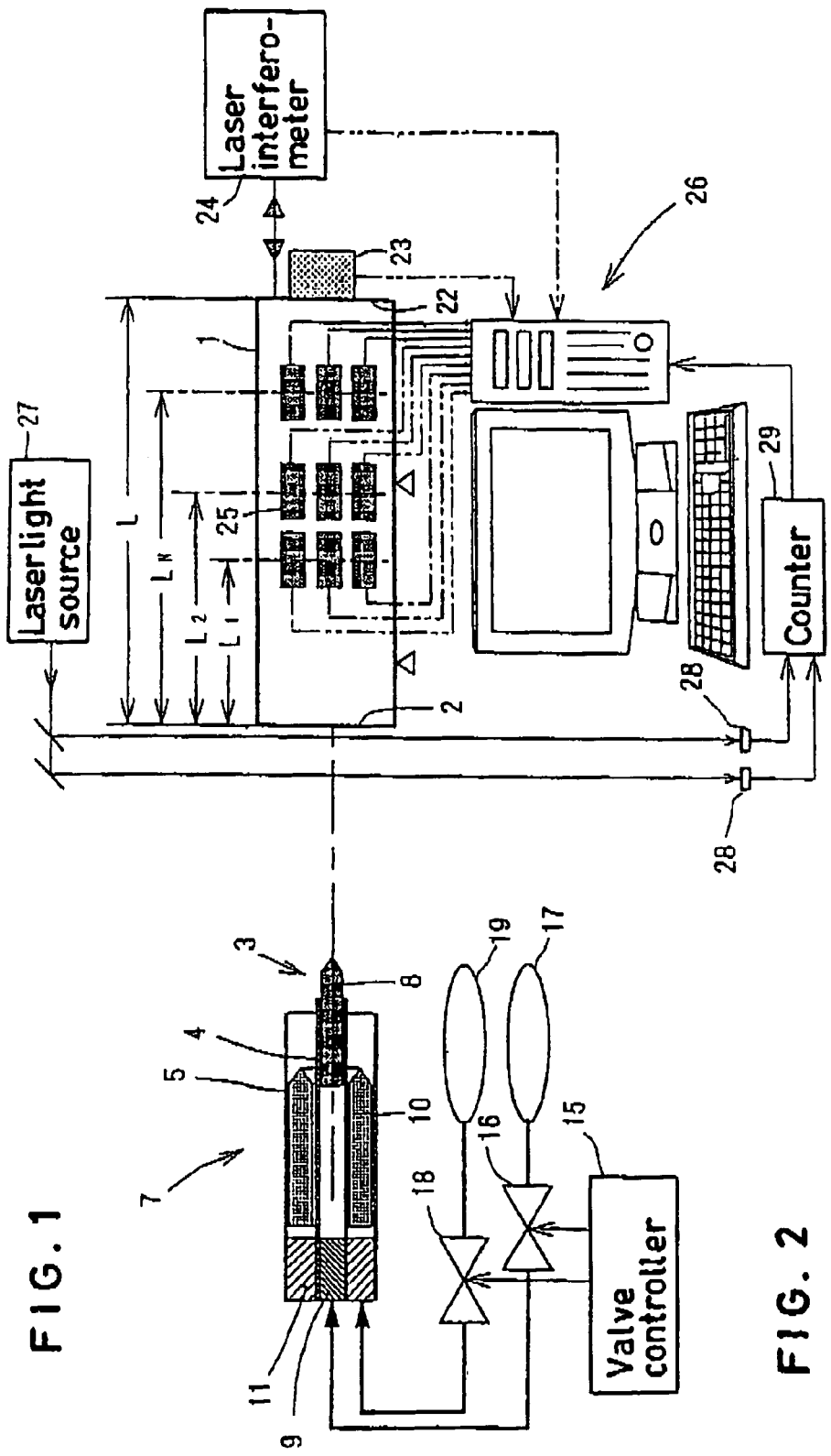
FIG. 1 is a schematic view of an apparatus for implementing the method for measuring the dynamic linearity of an acceleration sensor according to the present invention.
FIG. 2 is an explanatory view of an example of a set of projectiles used in the present invention.

FIG. 1 shows an embodiment of an apparatus for implementing the method for measuring the dynamic linearity of an acceleration sensor according to this invention. A projectile 3, described later, is used to impact a first end surface 2 of a metal rod 1 to apply a shock, generating an elastic wave pulse therein. From a multiple launch tube 7 having double center launch tube 4 and outer launch tube 5, two inner and outer projectiles 3 are launched. In the illustrated embodiment, a cylindrical inner projectile 8 can be independently launched from the interior of the center launch tube 4 by an inner launch apparatus 9, and an annular outer projectile 10 can be independently launched from the annular space between the center launch tube 4 and the outer launch tube 5 by an outer launch apparatus 11. The launch status can be detected by projecting in front of the metal rod 1 a pair of separated laser beams from a laser light source 27, using light receiving elements 28, 28 to detect an interruption of these laser beams, using a counter 29 to measure the time difference thereof, and inputting the data to a personal computer 26.

In the launch of each of the above projectiles, a valve controller 15 opens a first valve 16, supplying high-pressure air from a first high-pressure air source 17 to the inner launch apparatus 9 to thereby launch the inner projectile 8 in the inner launch tube 4 toward the first end surface 2 of the metal rod 1. When the first projectile 8 impacts the first end surface 2 of the metal rod 1, an elastic wave is produced within the metal rod 1 that propagates in the metal rod 1. The valve controller 15 also opens a second valve 18 a prescribed time after opening the first valve 16, supplying high-pressure air from a second high-pressure air source 19 to the outer launch apparatus 11, whereby the annular outer projectile 10 located between the center launch tube 4 and the outer launch tube 5 is launched toward the first end surface 2 of the metal rod 1. When the outer projectile 10 impacts the first end surface 2 of the metal rod 1, as in the above an elastic wave is generated inside the metal rod 1 and propagates in the metal rod 1 with a time-lag relative to the elastic wave generated by the impact of the inner projectile 8. FIG. 2 shows the above outer projectile 10 launched at a prescribed different time from the inner projectile 8.

In this way, the elastic waves generated in the metal rod 1 give rise to a composite elastic pulse waveform in the metal rod 1, and this waveform propagates with respect to the second end surface 22 of the metal rod 1. Thus, by using two projectiles and arbitrarily setting the launch timing of each projectile, in accordance with the superposition principle, overall, it becomes possible to generate a shock acceleration waveform having a prescribed duration time.

It is preferable for the contact surfaces between the launch tubes 4 and 5 and the projectiles 8 and 10, and the peripheral surface of each projectile, to be lubrication treated or provided with a surface treatment layer that lowers the friction coefficient. Also, high-polymer material, plastics, wood or the like can be affixed to the tip of the projectiles to narrow the frequency band of the elastic wave pulses generated in the metal rod 1 by the launch of each projectile. In this case, multiple projectiles may be used in which the projectile body has a laminated structure of different materials, such as metal, high-polymer material, or plastics, wood and so forth.

An elastic wave pulse generated at the first end surface 2 of the metal rod 1, as described above, propagates within the metal rod 1 and reflects at the second end surface 22, and is reflected. Shock acceleration generated perpendicular to the end surface in the reflection process is input to an acceleration sensor 23 that is the calibration object attached to that end surface. Also, the shock acceleration is measured precisely using a strain gauge 25, a laser interferometer 24 that projects a laser beam at the end surface, or by measuring using both, if necessary, and carrying out comparisons with the measured values from the acceleration sensor 23.

In the detection of the shock acceleration that is generated, when using a strain gauge 25 affixed to a side surface of the rod, the strain gauge 25 can be implemented as a single unit, or as a plurality arrayed axially along the metal rod, or as a plurality of such arrays. In the example shown in FIG. 1, there are three arrays of N gauges separated by $L_1$, $L_2$, . . . , $L_N$ from the first end surface 2. When using a plurality of strain gauges, the output signal from each gauge is input to a personal computer 26 used as a processor and signal processed to obtain the output frequency characteristics of a gauge at a representative location, and a predetermined correction function is used to obtain a result equivalent to the measured results of the laser interferometer 24. Moreover, although the above embodiment shows an example in which the laser interferometer 24 and the strain gauge 25 are used, the present invention can also be implemented using just one or the other.

In the above apparatus, the present invention can be implemented in various modes. In cases where an input acceleration is obtained from a velocity measured by the laser interferometer and the dynamic linearity of the acceleration sensor measured, this can be carried out in accordance with the following technique and theory. That is, when an elastic wave pulse that is generated by a projectile launched from a launch tube that impacts the end surface of the metal rod reflects at the end surface where the acceleration sensor is affixed and is reflected, with respect to the propagation velocity (C) of the longitudinal elastic wave and the strain rate of the incident elastic wave pulse, the shock acceleration (a(t)) generated having time (t) as a function and the strain ($\epsilon(t)$) of the incident elastic wave pulse on the end surface can be expressed by the following equation. Here, · represents a differential relating to time.

$$\alpha(t) = 2C\dot{\epsilon}(t) \quad (1.1)$$

In the case of a projectile launched from the inner launch tube, the acceleration generated at the end surface and the strain of the incident elastic wave pulse are taken to be $a_{in,1}(t)$ and $\epsilon_{in,1}(t)$, respectively. In the case of a projectile launched from the outer launch tube, if the acceleration generated at the end surface and the strain of the incident elastic wave pulse are taken to be $a_{in,2}(t)$ and $\epsilon_{in,2}(t)$, respectively, the following equations apply.

$$\alpha_{in,1}(t) = 2C\dot{\epsilon}_{in,1}(t) \quad (1.2)$$

$$\alpha_{in,2}(t) = 2C\dot{\epsilon}_{in,2}(t) \quad (1.3)$$

Also, since what can be measured by laser interferometer is the velocity of motion of the end surface, taking $v_{in,1}(t)$ and $v_{in,2}(t)$ as the velocity of motion of the end surface generated by an inner projectile and an outer projectile respectively, the following equations apply.

$$v_{in,1}(t) = 2C\epsilon_{in,1}(t) \quad (1.4)$$

$$v_{in,2}(t) = 2C\epsilon_{in,2}(t) \quad (1.5)$$

Therefore, when an inner projectile is launched on its own, when an outer projectile is launched on its own, when an inner projectile and an outer projectile are launched at the same time and with the same conditions as when launched on their own, taking the respective velocities of motion of the end surface measured by laser interferometer as $v_{in,L,1}(t)$, $v_{in,L,2}(t)$, $v_{in,L,1+2}(t)$, the following equations apply.

$$a_{in,L,1}(t) = \int_0^t v_{in,L,1}(\tau) d\tau \quad (1.6)$$

$$a_{in,L,2}(t) = \int_0^t v_{in,L,2}(\tau) d\tau \quad (1.7)$$

$$a_{in,L,1+2}(t) = \int_0^t v_{in,L,1+2}(\tau) d\tau \quad (1.8)$$

If the acceleration sensor output signals in each case are $a_{out,L,1}(t)$, $a_{out,L,2}(t)$, $a_{out,L,1+2}(t)$, the dynamic linearity of the acceleration sensor can be measured by clarifying the frequency range and acceleration range established by the following Equation (1.10) within the range in which Equation (1.9) applies.

$$\alpha_{in,L,1+2}(t) = \alpha_{in,L,1}(t) + \alpha_{in,L,2}(t) \quad (1.9)$$

$$\alpha_{out,L,1+2}(t) = \alpha_{out,L,1}(t) + \alpha_{out,L,2}(t) \quad (1.10)$$

Moreover, when the impacts of the outer projectile and inner projectile are not simultaneous, if the time difference is $\Delta t$, the dynamic linearity of the acceleration sensor can be measured by clarifying the frequency range and acceleration range in which the following Equation (1.11) applies.

$$\alpha_{out,L,1+2}(t) = \alpha_{out,L,1}(t) + \alpha_{out,L,2}(t - \Delta t) \quad (1.11)$$

Also, when the dynamic linearity of the acceleration sensor is measured using measurement signals of one strain gauge provided at an arbitrary distance from a first end surface of the metal rod, or of a plurality provided at the same distance on the circumference, this is done using the following technique and in accordance with the following theory. That is, in the example of the apparatus shown in FIG. 1, with respect to the output signal of a strain gauge affixed at a distance $L_1$ from the end surface impacted by a projectile, in the case of an inner projectile launched on its own, an outer projectile launched on its own, and an inner projectile and an outer projectile are launched at the same time and with the same conditions as when launched on their own are taken as $\epsilon_{L1,out,1}(t)$, $\epsilon_{L1,out,2}(t)$ and $\epsilon_{L1,out,1+2}(t)$, respectively, since strain gauge frequency response, elastic wave dispersion, attenuation, uncertainty of sound velocity value and the like are not taken into consideration, the gauge output signal that is the strain is regarded as the strain in the elastic wave pulse incident on the surface on which the acceleration sensor is attached.

Taking $a_{L1,out,1}(t)$, $a_{L1,out,2}(t)$ and $a_{L1,out,1+2}(t)$ as the acceleration sensor output signals corresponding to $\epsilon_{L1,in,1}(t)$, $\epsilon L_{1,in,2}(t)$ and $\epsilon_{L1,in,1+2}(t)$, the dynamic linearity of the acceleration sensor can be measured by clarifying the frequency range and acceleration range established by the following equation (2.2) within the range in which equation (2.1) applies.

$$2C\dot{\epsilon}_{L1,out,1+2}(t) = 2C\dot{\epsilon}_{L1,out,1}(t) + 2C\dot{\epsilon}_{L1,out,2}(t) \quad (2.1)$$

$$\alpha_{L1,out,1+2}(t) = \alpha_{L1,out,1}(t) + \alpha_{L1,out,2}(t) \quad (2.2)$$

Moreover, when the impacts of the outer projectile and inner projectile are not simultaneous, if the time difference is $\Delta t$, the dynamic linearity of the acceleration sensor can be measured by clarifying the frequency range and acceleration range in which the following equation (2.3) applies.

$$\alpha_{L1,out,1+2}(t) = \alpha_{L1,out,1}(t) + \alpha_{L1,out,2}(t - \Delta t) \quad (2.3)$$

When the dynamic linearity of the acceleration sensor is measured using the output of a plurality of strain gauges along the axis from a first end surface of the metal rod, this is done using the following technique and in accordance with the following theory. That is, in the example of the apparatus shown in FIG. 1, the plurality of strain gauges provided axially along the metal rod, are affixed at a position that is $L_n$ (n=1 . . . N) away from the first end surface of the metal rod that is the shock end surface. Also, $L_1$ is taken as the representative location of a gauge affixed at a plurality of locations axially along the metal rod. In this case, at each $L_n$ (n=1 . . . N) location, the wave incident on the end surface on which the acceleration sensor has been attached and the reflected wave have to be separated and observed.

Since in accordance with elastic wave propagation theory, the elastic wave pulse strain in a rod section that is far enough away from the impacted end surface will be a plane wave, and so can be analytically represented at a distance z and time t (assuming the projectile impact starts at t=0) from the impacted end surface. Thus, as a plane wave, the internal strain ($\epsilon(z, t)$) of the rod is expressed as in the following equation.

$$\epsilon(z,t)=F(z,t) \quad (3.1)$$

F(z, t) is expressed as follows. (Skalak's solution in the case of the first term of a series solution)

$$F(z, t) = \varepsilon_t(t, z) - \varepsilon_t\left(t - \frac{2l_p}{C_p}, z\right) \quad (3.2)$$

Here,
t: time
$l_p$: length of projectile
$C_p$: propagation velocity of longitudinal elastic wave in projectile
$\varepsilon_t$(t, z): primary term of Skalak's solution $$\varepsilon_t(t, z) = \frac{V_1}{\pi C}\left[\int_0^\infty \frac{\sin\left(\alpha_1\eta + \frac{\eta^3}{3}\right)}{\eta}d\eta + \int_0^\infty \frac{\sin\left(\alpha_2\eta + \frac{\eta^3}{3}\right)}{\eta}d\eta\right] \quad (3.3)$$

$$\alpha_1 = \frac{Z - Ct}{\left[\frac{3}{16}v^2 D_a^2 Ct\right]^{1/3}} \quad (3.4)$$

$$\alpha_2 = \frac{-Z - Ct}{\left[\frac{3}{16}v^2 D_a^2 Ct\right]^{1/3}} \quad (3.5)$$

Here,
$V_1$: collision velocity of projectile
t: elapsed time from collision
v: Poisson ratio
$D_a$: diameter of metal rod
z: axial coordinate of metal rod The following procedure is used in order to raise the sensitivity when a large number of strain gauges are used. The average value at the output section of a plurality of gauges at location $L_n$(n=1 ... N) is taken as $\epsilon L_n$(t) (impact starting time t=0). A wave takes time to propagate, so a signal output by strain gauges at location $L_n$(n=1 ... N) will not be in phase. So, in accordance with the following procedure, using equation (3.3), the output of a gauge affixed at location $L_n$ (n=2 ... N) can be converted to an equivalent output at representative location $L_1$.

$$\varepsilon_n^e(t) = L^{-1}\left[L[\varepsilon_{Ln}(t)]\frac{L\left[F\left(L_1, t - \frac{(L_n - L_1)}{C}\right)\right]}{L[F(L_n, t)]}\right] \quad (3.6)$$

(n = 2 ... N)

Here, [Formula 21] L, $L^{-1}$ are a Laplace operator and an inverse Laplace operator. Therefore, elastic wave pulse strain $\epsilon_r(L_1, t)$ at the representative location can be expressed by the following equation.

$$\varepsilon_r(L_1, t) = \frac{1}{N}\left[\varepsilon_{L1}(L_1, t) + \sum_{n=2}^{N}\varepsilon_n^e(t)\right] \quad (3.7)$$

In this way, by averaging the signals output by a plurality of strain gauges, it is possible to reduce the effect of noise and measure minute dynamic strain.

In the above mode, elastic wave dispersion and attenuation and the like due to the propagation of an elastic wave pulse from the representative strain gauge location to the end surface where the acceleration sensor is attached are not taken into consideration. Correction taking the dynamic characteristics of the strain gauge into consideration is not carried out. Thus, taking the representative strain signals at the representative location when an inner projectile is launched on its own, when an outer projectile is launched on its own, when an inner projectile and an outer projectile are launched at the same time and with the same conditions as when launched on their own as $\epsilon_{r,1}(L_1,t)$, $\epsilon_{r,2}(L_1,t)$ and $\epsilon_{r,1+2}(L_1,t)$, since the distance from the representative location of the plurality of strain gauges to the end surface where the acceleration sensor is attached is L-$L_1$, accelerations a(t) generated at the end surface where the acceleration sensor is attached in the three cases can be expressed, respectively, by the following equation.

$$a_{in,1}^r(t) = 2C\dot{\varepsilon}_{r,1}\left(L_1, t - \frac{L - L_1}{C}\right) \quad (3.8)$$

$$a_{in,2}^r(t) = 2C\dot{\varepsilon}_{r,2}\left(L_1, t - \frac{L - L_1}{C}\right) \quad (3.9)$$

$$a_{in,1+2}^r(t) = 2C\dot{\varepsilon}_{r,1+2}\left(L_1, t - \frac{L - L_1}{C}\right) \quad (3.10)$$

Taking $a^r_{out,1}$(t), $a^r_{out,2}$(t) and $a^r_{out}$,1+2(t) as the respective acceleration sensor output signals corresponding to the input accelerations of the above Equations (3.8), (3.9) and (3.10), the dynamic linearity of the acceleration sensor can be measured by clarifying the frequency range and acceleration range established by the following Equation (3.12) within the range in which Equation (3.11) applies.

$$\alpha_{in,1+2}^r(t) = \alpha_{in,1}^r(t) + \alpha_{in,2}^r(t) \quad (3.11)$$

$$\alpha_{out,1+2}^r(t) = \alpha_{out,1}^r(t) + \alpha_{out,2}^r(t) \quad (3.12)$$

When the impacts of the outer projectile and inner projectile are not simultaneous, if the time difference is Δt, the dynamic linearity of the acceleration sensor can be measured by clarifying the frequency range and acceleration range in which the following Equation (3.13) applies.

$$\alpha_{out,1+2}^r(t) = \alpha_{out,1}^r(t) + \alpha_{out,2}^r(t-\Delta t) \quad (3.13)$$

Also, when the dynamic linearity of the acceleration sensor is measured using measurement signals of one strain gauge provided at an arbitrary distance from a first end surface of the metal rod, or of a plurality provided at the same distance on the circumference, theoretically correcting the measurement signal and obtaining the strain of the elastic wave pulse incident on the end surface of the metal rod, this is done using the following technique and in accordance with the following theory. That is, in the example of the apparatus shown in FIG. 1, the output of a strain gauge affixed at one location in the axial direction is corrected according to elastic wave theory and the elastic wave pulse incident on the end surface obtained. At this time, the frequency response of the gauge is ignored. If the strain signal shown in the above Equations (1.2) and (1.3) is affixed a distance L1 from the impacted end surface, if $\epsilon_{in,1}(L_1,t)$ is the strain signal generated by the impact of just an inner projectile, $\epsilon_{in,2}(L_1,t)$ is the strain signal generated by the impact of just an outer projectile and $\epsilon_{in,1+2}(L_1,t)$ is the strain signal generated at the time of a simultaneous impact of an outer projectile and an inner projectile, the following equation applies.

$$\frac{L[\varepsilon_{in,1}(t)]}{L[\varepsilon_{in,1}(L_1, t)]} = \frac{L[\varepsilon_{in,2}(t)]}{L[\varepsilon_{in,2}(L_1, t)]} = \frac{L[\varepsilon_{in,1+2}(t)]}{L[\varepsilon_{in,1+2}(L_1, t)]} \quad (4.1)$$

$$= \frac{L[F(L, t)]}{L[F(L_1, t)]}$$

$\epsilon_{in,1+2}(t)$ and $\epsilon_{in,1+2}(L_1,t)$ are taken as the strain of the elastic wave pulse incident on the end surface where the acceleration sensor is attached, and the output signal of a strain gauge affixed a distance L1 from the impacted end surface, respectively, when an inner projectile and an outer projectile are launched simultaneously. If $a_{out,1}(t)$, $a_{out,2}(t)$ and $a_{out,1+2}(t)$ are the acceleration sensor output signals corresponding to $\epsilon_{in,1}(t)$, $\epsilon_{in,2}(t)$ and $\epsilon_{in,1+2}(t)$ obtained from the above Equation (4.1), the dynamic linearity of the acceleration sensor can be measured by clarifying the frequency range and acceleration range established by the following Equation (4.3) within the frequency range and acceleration range in which Equation (4.2) applies.

$$2C\dot{\epsilon}_{in,1+2}(t) = 2C\dot{\epsilon}_{in,1}(t) + 2C\dot{\epsilon}_{in,2}(t) \quad (4.2)$$

$$\alpha_{out,1+2}(t) = \alpha_{out,1}(t) + \alpha_{out,2}(t) \quad (4.3)$$

When the impacts of the outer projectile and inner projectile are not simultaneous, if the time difference is $\Delta t$, the dynamic linearity of the acceleration sensor can be measured by clarifying the frequency range and acceleration range in which the following Equation (4.4) applies.

$$\alpha_{out,1+2}(t) = \alpha_{out,1}(t) + \alpha_{out,2}(t-\Delta t) \quad (4.4)$$

Also, when the dynamic linearity of the acceleration sensor is measured using outputs, obtained from a plurality of strain gauges provided axially from a first end surface of the metal rod, that are theoretically corrected to obtain the strain of the elastic wave pulse incident on the end surface of the metal rod, this is done using the following technique and in accordance with the following theory. That is, in the example of the apparatus shown in FIG. 1, the method shown in Equation (3.7) is used as a method for calculating a representative value from the outputs of a plurality of strain gauges affixed in the axial direction. The strain gauge output signal at a representative location a prescribed distance away from the impacted end surface is obtained with respect to ($\epsilon_{r,1}(L_1,t)$) in the case of the launch of an inner projectile on its own, ($\epsilon_{r,2}(L_1,t)$) when an outer projectile is launched on its own, and ($\epsilon_{r,1+2}(L_1,t)$) when an inner projectile and an outer projectile impact the metal rod simultaneously.

$$\frac{L[\varepsilon^{rc}_{in,1}(t)]}{L[\varepsilon_{r,1}(L_1, t)]} = \frac{L[\varepsilon^{rc}_{in,2}(t)]}{L[\varepsilon_{r,2}(L_1, t)]} = \frac{L[\varepsilon^{rc}_{in,1+2}(t)]}{L[\varepsilon_{r,1+2}(L_1, t)]} \quad (5.1)$$

$$= \frac{L[F(L, t)]}{L[F(L_1, t)]}$$

$a^{rc}_{cout,1}(t)$, $a^{rc}_{out,2}(t)$ and $a^{rc}_{out,1+2}(t)$ are taken as the respective acceleration sensor output signals corresponding to $\epsilon_{r,1}(L_1,t)$, $\epsilon_{r,2}(L_1,t)$ and $\epsilon_{r,1+2}(L_1,t)$. Once thus determined, the dynamic linearity of the acceleration sensor can be measured by clarifying the frequency range and acceleration range established by the following Equation (5.3) within the frequency range and acceleration range in which Equation (5.2) applies.

$$2C\dot{\epsilon}_{in,1+2}^{rc}(t) = 2C\dot{\epsilon}_{in,1}^{rc}(t) + 2C\dot{\epsilon}_{in,2}^{rc}(t) \quad (5.2)$$

$$\alpha_{out,1+2}^{rc}(t) = \alpha_{out,1}^{rc}(t) + \alpha_{out,2}^{rc}(t) \quad (5.3)$$

When the impacts of the outer projectile and inner projectile are not simultaneous and the time difference is $\Delta t$, the dynamic linearity of the acceleration sensor can be measured by clarifying the frequency range and acceleration range in which the following Equation (5.4) applies.

$$\alpha_{out,1+2}^{rc}(t) = \alpha_{out,1}^{rc}(t) + \alpha_{out,2}^{rc}(t-\Delta t) \quad (5.4)$$

Also, when the dynamic linearity of the acceleration sensor is measured using measurement signals of one strain gauge provided at an arbitrary distance from a first end surface of the metal rod, or of a plurality provided at the same distance on the circumference, corrected using the results of measurements by a laser interferometer and obtaining the strain of the elastic wave pulse incident on the end surface of the metal rod, this is done using the following technique and in accordance with the following theory. That is, in the example of the apparatus shown in FIG. 1, the velocity of motion ($v_L(t)$) of the end surface of the rod is measured by a laser interferometer, and the relationship to the strain of the incident elastic wave pulse ($\epsilon_{iL}(t)$) is expressed as $v_L(t)=2C\epsilon_{iL}(t)$. When the input acceleration to the acceleration sensor is estimated from the strain gauge output to verify the linearity of the input acceleration, the gauge frequency response is corrected to correct for the effect of wave dispersion, wave attenuation, acceleration sensor mass and the like, based on the output of the laser interferometer.

The position of a strain gauge affixed to one spot in the axial direction is taken to be $L_1$ from the impacted end surface. The gauge output signal is $\epsilon_{L1,out,1}(t)$ in the case of the launch of an inner projectile on its own, $\epsilon_{L1,out,2}(t)$ when an outer projectile is launched on its own, and $\epsilon_{L1,out,1+2}(t)$ when an inner projectile and an outer projectile are launched simultaneously. At this time, the following correction function ($G_{CL}(j\omega)$) that converts the gauge output signal to strain of the elastic wave pulse incident on the end surface where the acceleration sensor is attached is obtained.

$$G_{CL}(j\omega) = \frac{L\left[\varepsilon_{Ll,out}\left(t - \frac{L-L_1}{C}\right)\right]}{L[\varepsilon_{iL}(t)]} \quad (6.1)$$

Once thus determined, if $a^{CL1}_{out,1}(t)$ is the acceleration output when an inner projectile is launched on its own, $a^{CL1}_{out,2}(t)$ is the acceleration sensor output when an outer projectile is launched on its own, and $a^{CL1}_{out,1+2}(t)$ is the acceleration sensor output when an inner projectile and an outer projectile are launched simultaneously, the dynamic linearity of the acceleration sensor can be measured by clarifying the frequency range and acceleration range established by the following Equation (6.3) within the frequency range and acceleration range in which Equation (6.2) applies.

$$2C\frac{d}{dt}\left[L^{-1}\left[\frac{L[\varepsilon_{LI,out,1+2}(t)]}{G_{CL}(j\omega)}\right]\right] = 2C\frac{d}{dt}\left[L^{-1}\left[\frac{L[\varepsilon_{LI,out,1+2}(t)]}{G_{CL}(j\omega)}\right]\right] + \quad (6.2)$$

$$2C\frac{d}{dt}\left[L^{-1}\left[\frac{L[\varepsilon_{LI,out,1+2}(t)]}{G_{CL}(j\omega)}\right]\right]$$

$$a_{out,1+2}^{CLI}(t) = a_{out,1}^{CLI}(t) + a_{out,2}^{CLI}(t) \quad (6.3)$$

When the impacts of the outer projectile and inner projectile are not simultaneous, if the time difference is Δt, the dynamic linearity of the acceleration sensor can be measured by clarifying the frequency range and acceleration range in which the following Equation (6.4) applies.

$$a_{out,1+2}^{CLI}(t) = a_{out,1}^{CLI}(t) + a_{out,2}^{CLI}(t - \Delta t) \quad (6.4)$$

Also, when the dynamic linearity of the acceleration sensor is measured using outputs, obtained from a plurality of strain gauges provided axially from a first end surface of the metal rod, that are corrected based on measured results obtained with the laser interferometer, to obtain the strain of the elastic wave pulse incident on the end surface of the metal rod, this is done using the following technique and in accordance with the following theory. That is, in the example of the apparatus shown in FIG. 1, with respect to the strain gauge output signal at the representative location obtained by the above Equation (3.7), the strain gauge output signal is taken to be $\epsilon^N_{r,1}(L_1,t)$ in the case of an inner projectile launched on its own, $\epsilon^N_{r,2}(L_1,t)$ in the case of an outer projectile launched on its own, and $\epsilon^N_{r,1+2}(L_1,t)$ in the case of an inner projectile and an outer projectile launched simultaneously.

If $a^{CLN}_{out,1}(t)$ is the acceleration output when an inner projectile is launched on its own, $a^{CLN}_{out,2}(t)$ is the acceleration sensor output when an outer projectile is launched on its own, and $a^{CLN}_{out,1+2}(t)$ is the acceleration sensor output when an inner projectile and an outer projectile are launched simultaneously, the dynamic linearity of the acceleration sensor can be measured by clarifying the frequency range and acceleration range established by the following Equation (7.3) within the frequency range and acceleration range in which Equation (7.2) applies.

$$2C\frac{d}{dt}\left[L^{-1}\left[\frac{L[\varepsilon^N_{r,1+2}(L_1,t)]}{G_{CL}(j\omega)}\right]\right] = 2C\frac{d}{dt}\left[L^{-1}\left[\frac{L[\varepsilon^N_{r,1}(L_1,t)]}{G_{CL}(j\omega)}\right]\right] + 2C\frac{d}{dt}\left[L^{-1}\left[\frac{L[\varepsilon^N_{r,2}(L_1,t)]}{G_{CL}(j\omega)}\right]\right]$$

$$a_{out,1+2}^{CLN}(t) = a_{out,1}^{CLN}(t) + a_{out,2}^{CLN}(t)$$

When the impacts of the outer projectile and inner projectile are not simultaneous and the time difference is Δt, the dynamic linearity of the acceleration sensor can be measured by clarifying the frequency range and acceleration range in which the following Equation (7.3) applies.

$$a_{out,1+2}^{CLN}(t) = a_{out,1}^{CLN}(t) + a_{out,2}^{CLN}(t - \Delta t) \quad (7.3)$$

The basis of the present invention is means for measuring the dynamic linearity of an acceleration sensor described in the above, and, further, various modes may be implemented. As described above, high-polymer material or plastics or the like can be affixed to the tip of the projectiles in laminations, or different materials, such as metal, high-polymer material, plastics and the like, can be laminated within the main body of the projectiles to provide the projectiles used with a laminated structure, overall to thereby arbitrarily control the frequency band of the elastic wave pulse generated in the metal rod.

With respect to the use of a double launch tube comprising an inner launch tube and an outer launch tube, in the launching of two round, concentrically located projectiles, each of the inner launch tube and outer launch tube can be formed as a multiple launch tube that makes it possible to launch multiple projectiles from the inner launch tube and outer launch tube and control the projectile launch phase, and thereby narrow the frequency band of the elastic wave generated in the metal rod.

Also, in accordance with the theory of elastic wave propagation in the metal rod, when obtaining the transient strain signal of the elastic wave pulse incident on the end surface from the output signal of a strain gauge, at least a primary term or, for higher precision, up to a high-order term of a series-expanded Skalak's solution may be used.

Measuring the dynamic linearity of the acceleration sensor is an essential prerequisite to obtaining the frequency response characteristics of the acceleration sensor by comparing in frequency domain an acceleration sensor input acceleration signal with an acceleration sensor output signal derived from the results of measuring the acceleration, velocity of the motion of the end surface of the metal rod or strain gauge measurements, and wave propagation theory.

Also, to consider the non-simultaneity of the impact of two projectiles, a difference in timing (Δt) between the impact on the metal rod of a first projectile from the inner launch tube and the impact on the metal rod of a second projectile from the outer launch tube can be obtained as a parameter in which the transient acceleration signal input to the acceleration sensor generated when a first projectile impacts the metal rod and the transient acceleration signal input to the acceleration sensor generated when a second projectile impacts the metal rod best match the transient acceleration signal input to the acceleration sensor generated when both projectiles are launched simultaneously, and the dynamic linearity of the acceleration sensor measured from the acceleration sensor output signal obtained when the first projectile and second projectile are each launched on its own and the acceleration sensor output signal obtained when the first projectile and second projectile are launched at a different time but substantially simultaneously.

The metal rod can be supported horizontally by a support means that does not hinder rigid motion in an axial direction, by using point contact such as is utilized in ball bearings, roller bearings and the like, thereby minimizing the effect on the elastic wave propagation.

A metal ball can be attached so that it contacts the metal rod end surface, and a plurality of projectiles launched at the ball from the multiple round, concentric launch tubes, with the projectiles being launched at a precisely controlled launch timing to generate an elastic wave pulse in the metal rod.

When one strain gauge is provided at an arbitrary distance from a first end surface of the metal rod, or a plurality are provided on the circumference at the same distance, and a correction function for correcting the output signals of the strain gauges with respect to wave dispersion, wave attenuation and uncertainty of sound velocity value is obtained from the measured results obtained with a laser interferometer, this may be done with the acceleration sensor not attached to the end surface of the metal rod that propagates the elastic wave pulse.

Also, when there are a plurality of strain gauges provided in an axial direction from a first end surface of the metal rod, or the strain gauges are provided at a plurality of locations in the axial direction, or a plurality of the strain gauges are provided on the circumference at a same distance from an end surface of the metal rod, and a correction function for correcting the output signals of the strain gauges with respect to wave dispersion, wav attenuation, uncertainty of sound velocity value, acceleration sensor mass and effect on the portion to which the acceleration sensor is attached, is obtained from the measured results obtained with a laser interferometer, this may be done, with the acceleration sensor attached to the end surface of the metal rod that propagates the elastic wave pulse.

A correction function correcting wave dispersion, wave attenuation, uncertainty of sound velocity value, acceleration sensor mass, gauge frequency response and the like, and the metal rod to which a gauge is affixed, may be constituted as a set of essential replacement parts required to match individual acceleration sensors.

INDUSTRIAL APPLICABILITY

As described in the foregoing, the present invention is configured so that an elastic wave pulse is generated in a metal rod by impacting a projectile against the metal rod, the acceleration at that end surface is measured by an acceleration sensor, the motion of the end surface is measured by a laser interferometer or a strain gauge, the measurement signals are calculated and corrected, and the calculated results and the measured values of the acceleration sensor are compared in time domain and frequency domain. So with respect to acceleration sensors that are utilized in fields important to industry, the dynamic linearity of the acceleration sensor can be measured accurately and easily over a wide range, from acceleration values generally utilized in such fields up to acceleration in the order of $10^6$ m/s$^2$, and calibration of the acceleration sensor can be carried out easily. Accordingly, it can contribute to establishing a primary measuring standard for acceleration sensors, and can also contribute to establishing a secondary measuring standard for acceleration sensors, improving the reliability of measurements by acceleration sensors, and improving the reliability of measurement of high-shock acceleration. The reliability of evaluations of the frequency characteristics of acceleration sensors is also improved, making it possible to lay down domestic standards relating to the dynamic linearity of acceleration sensors, and to lay down international standards relating to the dynamic linearity of acceleration sensors.

The invention claimed is:

1. A method for measuring dynamic linearity of an acceleration sensor, comprising:
    generating an elastic wave pulse in a metal rod by impacting one of end surfaces of the metal rod with each of two round, concentrically located projectiles from a double launch tube independently, and by impacting both projectiles simultaneously or at a prescribed time interval;
    using an acceleration sensor provided on the other of the end surfaces of the metal rod to measure an acceleration of the other end surface arising when the elastic wave pulse generated by the impact of the projectiles reflects at the other end surface; and
    using an optical measuring instrument to measure and calculate the acceleration of the other end surface,
    wherein the dynamic linearity of the acceleration sensor is obtained by comparing in time domain and frequency domain an acceleration output signal of the acceleration sensor, when two projectiles are impacted simultaneously or at a prescribed time interval, with a sum of acceleration signals obtained when two projectiles are launched separately, measured and calculated by the optical measuring instrument.

2. A method for measuring dynamic linearity of an acceleration sensor, comprising:
    generating an elastic wave pulse in a metal rod by impacting one of end surfaces of the metal rod with each of two round, concentrically located projectiles from a double launch tube independently, and by impacting both projectiles simultaneously or at a prescribed time interval;
    using an acceleration sensor provided on the other of the end surfaces of the metal rod to measure an acceleration of the other end surface arising when an elastic wave pulse generated by the impact of the projectiles reflects at the other end surface; and
    using at least one strain gauge provided on a side surface of the metal rod to measure strain in the elastic wave pulse produced by the impact of the projectiles;
    wherein the dynamic linearity of the acceleration sensor is obtained by comparing in time domain and frequency domain an output signal of the acceleration sensor, when two projectiles are impacted simultaneously or at a prescribed time interval, with a sum of acceleration signals obtained from strain gauge measurement signals obtained when two projectiles are launched separately.

3. A method for measuring dynamic linearity of an acceleration sensor, comprising:
    generating an elastic wave pulse in a metal rod by impacting one of end surfaces of the metal rod with each of two round, concentrically located projectiles from a double launch tube independently, and by impacting both projectiles simultaneously or at a prescribed time interval;
    using an acceleration sensor provided on the other of the end surfaces of the metal rod to measure an acceleration of the other end surface arising when the elastic wave pulse generated by the impact of the projectiles reflects at the other end surface; and measuring strain in the elastic wave pulse produced by the impact of the projectiles with a plurality of strain gauges affixed axially along a side surface of the metal rod;

wherein the dynamic linearity of the acceleration sensor is obtained by comparing in time domain and frequency domain an output signal of the acceleration sensor, when two projectiles are impacted simultaneously or at a prescribed time interval, with a sum of acceleration signals obtained from strain gauge measurement signals obtained when two projectiles are launched separately.

4. A method for measuring dynamic linearity of an acceleration sensor, comprising:

generating an elastic wave pulse in a metal rod by impacting one of end surfaces of the metal rod with each of two round, concentrically located projectiles from a double launch tube independently, and by impacting both projectiles simultaneously or at a prescribed time interval, using an acceleration sensor provided on the other of the end surfaces of the metal rod to measure an acceleration of the other end surface arising when the elastic wave pulse generated by the impact of the projectiles reflects at the other end surface;

using at least one strain gauge provided on a side surface of the metal rod to measure strain in the elastic wave pulse produced by the impact of the projectiles; and calculating a correction to a strain gauge measurement signal corresponding to wave dispersion and attenuation according to elastic wave pulse propagation theory, wherein the dynamic linearity of the acceleration sensor is obtained by comparing in time domain and frequency domain an output signal of the acceleration sensor, when two projectiles are impacted simultaneously or at a prescribed time interval, with a sum of acceleration signals obtained from the calculated corrected signals obtained from the strain gauge when two projectiles are launched separately.

5. A method for measuring dynamic linearity of an acceleration sensor, comprising:

generating an elastic wave pulse in a metal rod by impacting one of end surfaces of the metal rod with each of two round, concentrically located projectiles from a double launch tube independently, and by impacting both projectiles simultaneously or at a prescribed time interval;

using an acceleration sensor provided on the other of the end surfaces of the metal rod to measure an acceleration of the other end surface arising when the elastic wave pulse generated by the impact of the projectiles reflects at the other end surface;

measuring strain in the elastic wave pulse produced by the impact of the projectiles with a plurality of strain gauges affixed axially along a side surface of the metal rod; and calculating a correction to a strain gauge measurement signal corresponding to wave dispersion and attenuation according to elastic wave pulse propagation theory, wherein the dynamic linearity of the acceleration sensor is obtained by comparing in time domain and frequency domain an output signal of the acceleration sensor, when two projectiles are impacted simultaneously or at a prescribed time interval, with a sum of acceleration signals obtained from the calculated corrected signals obtained from the plurality of strain gauges when two projectiles are launched separately.

6. A method for measuring dynamic linearity of an acceleration sensor, comprising:

generating an elastic wave pulse in a metal rod by impacting one of end surfaces of the metal rod with each of two round, concentrically located projectiles from a double launch tube independently, and by impacting both projectiles simultaneously or at a prescribed time interval;

using an acceleration sensor provided on the other of the end surfaces of the metal rod to measure an acceleration of the other end surface arising when the elastic wave pulse generated by the impact of the projectiles reflects at the other end surface;

using an optical measuring instrument to measure the acceleration of the other end surface;

using at least one strain gauge provided on a side surface of the metal rod to measure strain in the elastic wave pulse produced by the projectile impact; and calculating a correction to a strain gauge measurement signal corresponding to wave dispersion and attenuation according to elastic wave pulse propagation theory, using an output signal of the optical measuring instrument that measured the acceleration of the other end surface, wherein the dynamic linearity of the acceleration sensor is obtained by comparing in time domain and frequency domain an output signal of the acceleration sensor, when two projectiles are impacted simultaneously or at a prescribed time interval, with a sum of acceleration signals obtained from calculated corrected signals obtained from the at least one strain gauge when two projectiles are launched separately.

7. A method for measuring dynamic linearity of an acceleration sensor, comprising:

generating an elastic wave pulse in a metal rod by impacting one of end surfaces of the metal rod with each of two round, concentrically located projectiles from a double launch tube independently, and by impacting both projectiles simultaneously or at a prescribed time interval;

using an acceleration sensor provided on the other of the end surfaces of the metal rod to measure an acceleration of the other end surface arising when the elastic wave pulse generated by the impact of the projectiles reflects at the other end surface;

using an optical measuring instrument to measure the acceleration of the other end surface;

measuring strain in the elastic wave pulse produced by the impact of the projectiles with a plurality of strain gauges affixed axially along a side surface of the metal rod; and calculating a correction to a strain gauge measurement signal corresponding to wave dispersion and attenuation according to elastic wave pulse propagation theory, using an output signal of the optical measuring instrument that measured the acceleration of the other end surface, wherein the dynamic linearity of the acceleration sensor is obtained by comparing in time domain and frequency domain an output signal of the acceleration sensor, when two projectiles are impacted simultaneously or at a prescribed time interval, with a sum of acceleration signals obtained from the calculated corrected signals obtained from the plurality of strain gauges when two projectiles are launched separately.

8. The method for measuring dynamic linearity of an acceleration sensor according to any one of claims 2, 4, and 6, wherein the at least one strain gauge is composed of at least two strain gauges provided on a circumference of the metal rod at a same distance from the one end surface of the metal rod, and output signals from the at least two strain gauges are used in said measuring step.

9. The method for measuring dynamic linearity of an acceleration sensor according to either one of claims 3 or 7, wherein each of a subset of the plurality of strain gauges are provided on a circumference of the metal rod at a same axial distance from the one end surface of the metal rod, and output signals from the plurality of strain gauges are used.

10. The method for measuring dynamic linearity of an acceleration sensor according to any one of claims 1, 6, and 7, wherein the optical measuring instrument comprises a laser interferometer.

11. An apparatus for measuring dynamic linearity of an acceleration sensor, comprising:
a launch apparatus configured to impact one of end surfaces of a metal rod with each of two round, concentrically located projectiles from a double launch tube independently and impact both projectiles simultaneously or at a prescribed time interval to generate an elastic wave pulse in the metal rod;
an acceleration sensor affixed to the other of the end surfaces of the metal rod to measure an acceleration of the other end surface arising when the elastic wave pulse generated by the impact of the projectiles reflects at the other end surface;
an optical measuring instrument configured to measure a velocity of motion of the other end surface and to calculate an acceleration value from the measured velocity; and
comparison means that compares in time domain and frequency domain an output signal of the acceleration sensor when two projectiles are impacted simultaneously or at a prescribed time interval with the acceleration obtained when two projectiles are launched separately, measured, and calculated by the optical measuring instrument.

12. An apparatus for measuring dynamic linearity of an acceleration sensor, comprising:
a launch apparatus configured to impact one of end surfaces of a metal rod with each of two round, concentrically located projectiles from a double launch tube independently and impact both projectiles simultaneously or at a prescribed time interval to generate an elastic wave pulse in a metal rod;
an acceleration sensor affixed to the other of the end surfaces of the metal rod to measure an acceleration of the other end surface arising when the elastic wave pulse generated by the impact of the projectiles reflects at the other end surface;
at least one strain gauge provided on a side surface of the metal rod to measure strain in the elastic wave pulse; and
comparison means that compares in time domain and frequency domain an output signal of the acceleration sensor, when the two projectiles are impacted simultaneously or at a prescribed time interval, with a sum of acceleration signals obtained from strain gauge measurement signals obtained when the two projectiles are launched separately.

13. An apparatus for measuring dynamic linearity of an acceleration sensor, comprising:
a launch apparatus configured to impact one of end surfaces of a metal rod with each of two round, concentrically located projectiles from a double launch tube independently and impact both projectiles simultaneously or at a prescribed time interval to generate an elastic wave pulse in the metal rod;
an acceleration sensor affixed to the other of the end surfaces of the metal rod to measure an acceleration of the other end surface arising when the elastic wave pulse generated by the impact of the projectiles reflects at the other end surface;
a plurality of strain arrays including one or more gauges affixed axially along a side surface of the metal rod that measures strain in the elastic wave pulse; and
comparison means that compares in time domain and frequency domain an output signal of the acceleration sensor, when the two projectiles are impacted simultaneously or at a prescribed time interval, with a sum of acceleration signals obtained from strain measurement signals produced by the acceleration at a representative strain gauge location.

14. An apparatus for measuring dynamic linearity of an acceleration sensor, comprising:
a launch apparatus configured to impact one of end surfaces of the metal rod with each of two round, concentrically located projectiles from a double launch tube independently and impact both projectiles simultaneously or at a prescribed time interval to generate an elastic wave pulse in the metal rod;
an acceleration sensor affixed to the other of the end surfaces of the metal rod to measure an acceleration of the other end surface arising when the elastic wave pulse generated by the impact of the projectiles reflects at the other end surface;
at least one strain gauge provided on a side surface of the metal rod to measure strain in the elastic wave pulse;
calculation means that calculates a correction to a strain gauge measurement signal corresponding to wave dispersion and attenuation according to elastic wave pulse propagation theory; and
comparison means that compares in time domain and frequency domain an output signal of the acceleration sensor, when the two projectiles are impacted simultaneously or at a prescribed time interval, with a sum of acceleration signals obtained from the calculated corrected signals obtained from the at least one strain gauge when the two projectiles are launched separately.

15. An apparatus for measuring dynamic linearity of an acceleration sensor, comprising:
a launch apparatus configured to impact one of end surfaces of a metal rod with each of two round, concentrically located projectiles from a double launch tube independently and impact both projectiles simultaneously or at a prescribed time interval to generate an elastic wave pulse in the metal rod;
an acceleration sensor affixed to the other of the end surfaces of the metal rod to measure an acceleration of the other end surface arising when the elastic wave pulse generated by the impact of the projectiles reflects at the other end surface;
a plurality of strain gauges affixed axially along a side surface of the metal rod that measures strain in the elastic wave pulse;
calculation means that obtains a representative location measurement signal from a strain gauge measurement signal and calculates a correction to the representative location measurement signal corresponding to wave dispersion and attenuation according to elastic wave pulse propagation theory; and comparison means that compares in time domain and frequency domain an output signal of the acceleration sensor, when the two projectiles are impacted simultaneously or at a prescribed time interval, with a sum of acceleration signals obtained from the calculated corrected signals based on strain gauge measurement signals obtained when the two projectiles are launched separately.

16. An apparatus for measuring dynamic linearity of an acceleration sensor, comprising:

a launch apparatus configured to impact one of end surfaces of a metal rod with each of two round, concentrically located projectiles from a double launch tube independently and impact both projectiles simultaneously or at a prescribed time interval to generate an elastic wave pulse in the metal rod;

an acceleration sensor affixed to the other of the end surfaces of the metal rod to measure an acceleration of the other end surface arising when the elastic wave pulse generated by the impact of the projectiles reflects at the other end surface;

a plurality of strain gauges affixed axially along a side surface of the metal rod for measuring strain in the elastic wave pulse;

an optical measuring instrument configured to measure a velocity of motion of the other end surface;

calculation means that calculates a correction to a strain gauge measurement signal corresponding to wave dispersion and attenuation according to elastic wave pulse propagation theory, based on an output signal of the optical measuring instrument; and comparison means that compares in time domain and frequency domain an output signal of the acceleration sensor, when the two projectiles are impacted simultaneously or at a prescribed time interval, with a sum of acceleration signals obtained from the calculated corrected signals obtained from the plurality of strain gauges when the two projectiles are launched separately.

17. The apparatus for measuring dynamic linearity of an acceleration sensor according to any one of claims 12 and 14, wherein the at least one strain gauge is composed of at least two strain gauges provided on a circumference of the metal rod at a same distance from the one end surface of the metal rod, and output signals from the at least one strain gauge are used to measure strain in the elastic pulse.

18. The apparatus for measuring dynamic linearity of an acceleration sensor according to claim 16, wherein the calculation means calculates the correction to the strain gauge measurement signal, corresponding to wave dispersion and attenuation according to elastic wave pulse propagation theory, based on an output signal of the optical measuring instrument, with the acceleration sensor not attached to the metal rod.

19. An apparatus for measuring dynamic linearity of an acceleration sensor, comprising:

a launch apparatus configured to impact one of end surfaces of a metal rod with each of two round, concentrically located projectiles from a double launch tube independently and impact both projectiles simultaneously or at a prescribed time interval to generate an elastic wave pulse in the metal rod;

an acceleration sensor affixed to the other of the end surfaces of the metal rod to measure an acceleration of the other end surface arising when the elastic wave pulse generated by the impact of the projectiles reflects at the other end surface;

a plurality of strain gauges affixed axially along a side surface of the metal rod that measures strain in the elastic wave pulse;

an optical measuring instrument configured to measure a velocity of motion of the other end surface;

calculation means that calculates a correction to a strain measurement signal produced by the acceleration at a representative strain gauge location corresponding to wave dispersion and attenuation according to elastic wave pulse propagation theory, based on an output signal of the optical measuring instrument; and comparison means that compares in time domain and frequency domain an output signal of the acceleration sensor with a calculated corrected signal obtained from the plurality of strain gauges.

20. The apparatus for measuring dynamic linearity of an acceleration sensor according to any one of claims 13, 15, 16, and 19, wherein each of a subset of the plurality of strain gauges are provided on a circumference of the metal rod at a same axial distance from the one end surface of the metal rod.

21. The apparatus for measuring dynamic linearity of an acceleration sensor according to either one of claims 16 or 19, wherein the optical measuring instrument comprises a laser interferometer.

22. The apparatus for measuring dynamic linearity of an acceleration sensor according to claim 19, wherein the calculation means calculates a correction to an elastic wave pulse strain signal produced at a representative strain gauge location by the impact of the projectiles, corresponding to wave dispersion and attenuation according to elastic wave pulse propagation theory, based on a signal of the optical measuring instrument, with the acceleration sensor attached to the metal rod.

23. The apparatus for measuring dynamic linearity of an acceleration sensor according to any one of claims 12 to 16 and 19, wherein both projectiles have a laminated structure of different materials.

24. The apparatus for measuring dynamic linearity of an acceleration sensor according to any one of claims 12 to 16 and 19, wherein the double launch tube includes inner and outer launch tubes in which a frequency band of the elastic wave generated in the metal rod can be narrowed by launching multiple projectiles from the inner launch tube and controlling a phase of each projectile launch.

25. The apparatus for measuring dynamic linearity of an acceleration sensor according to any one of claims 12 to 16 and 19, wherein in accordance with a theoretical propagation of the elastic wave in the metal rod, when obtaining transient signal distortion of the elastic wave pulse incident on the other end surface from a strain gauge output signal, at least a primary term of a series-expanded Skalak's solution is used.

26. The apparatus for measuring dynamic linearity of an acceleration sensor according to any one of claims 12 to 16 and 19, wherein in accordance with a theoretical propagation of the elastic wave in the metal rod, when obtaining transient signal distortion of the elastic wave pulse incident on the other end surface from a strain gauge output signal, up to a high-order term of a series-expanded Skalak's solution is used.

27. The apparatus for measuring dynamic linearity of an acceleration sensor according to any one of claims 12 to 16 and 19, wherein the dynamic linearity of the acceleration sensor is measured by measuring the acceleration of the metal rod end surface and comparing in frequency domain an acceleration sensor input acceleration signal with an acceleration sensor output signal derived from acceleration measurement results, strain gauge measurements, or wave propagation theory.

28. The apparatus for measuring dynamic linearity of an acceleration sensor according to any one of claims 12 to 16 and 19, further comprising:
 a dynamic linearity calculation means that obtains a difference in timing at which the two projectiles impact the metal rod as a parameter in which a transient acceleration signal input to the acceleration sensor generated when a first projectile impacts the metal rod, and a transient acceleration signal input to the acceleration sensor generated when a second projectile impacts the metal rod, best match a transient acceleration signal input to the acceleration sensor generated when both projectiles are launched simultaneously, and measures the dynamic linearity of the acceleration sensor from an acceleration sensor output signal obtained when each projectile is launched simultaneously or at a prescribed time differential.

29. The apparatus for measuring dynamic linearity of an acceleration sensor according to any one of claims 12 to 16 and 19, further comprising:
 a support means for using point contact that does not hinder rigid motion in an axial direction for supporting the metal rod horizontally.

30. The apparatus for measuring dynamic linearity of an acceleration sensor according to any one of claims 12 to 16 and 19, further comprising:
 a metal ball contacted to the end surface of the metal rod, wherein
 the projectile launch apparatus launches a plurality of projectiles disposed in a concentric circle from the double launch tube and precisely controls the launch timing with respect to the metal ball to generate an elastic wave pulse in the metal rod.

31. The apparatus for measuring dynamic linearity of an acceleration sensor according to any one of claims 12 to 16 and 19, further comprising:
 a set of essential replacement parts required to match individual acceleration sensors for correcting wave dispersion, wave attenuation, uncertainty of sound velocity value, acceleration sensor mass and gauge frequency response, and the metal rod to which a gauge is affixed.

32. The method for measuring dynamic linearity of an acceleration sensor according to any one of claims 1 to 7, wherein the double launch tube further comprises:
 an inner tube configured to launch a single inner projectile or a group of multiple inner projectiles;
 an outer tube configured to launch a single outer projectile or a group of multiple outer projectiles,
 wherein the launching of projectiles from the inner and outer tubes is independent of a launch sequence.

33. The apparatus for measuring dynamic linearity of an acceleration sensor according to any one of claims 12 to 16 and 19, wherein the double launch tube further comprises:
 an inner tube configured to launch a single inner projectile or a group of multiple inner projectiles;
 an outer tube configured to launch a single outer projectile or a group of multiple outer projectiles,
 wherein the launching of projectiles from the inner and outer tubes does is independent of a launch sequence.

\* \* \* \* \*